United States Patent [19]

Landell et al.

[11] 4,019,274
[45] Apr. 26, 1977

[54] TROLLING BUCKET WITH LOADING LATCH MEANS

[75] Inventors: Harper Landell; John M. Michel, both of Downingtown, Pa.

[73] Assignee: Woodstream Corporation, Lititz, Pa.

[22] Filed: Sept. 20, 1976

[21] Appl. No.: 724,753

[52] U.S. Cl. .................................. 43/55; 43/56; 220/335

[51] Int. Cl.$^2$ .................................. A01K 97/04

[58] Field of Search ................ 43/55, 56; 220/335

[56] References Cited

UNITED STATES PATENTS

| 1,088,145 | 2/1914 | Goldman | 220/335 X |
| 2,111,959 | 3/1938 | Baxter | 43/55 |
| 2,571,482 | 10/1951 | Pettit | 220/335 |
| 2,613,843 | 10/1952 | Suda | 220/335 |
| 2,884,736 | 5/1959 | Harrell | 43/56 |
| 3,009,281 | 11/1961 | Unger | 43/56 |
| 3,728,812 | 4/1973 | Woolworth et al. | 43/55 |

Primary Examiner—Louis G. Mancene
Assistant Examiner—Daniel J. Leach

[57] ABSTRACT

A trolling bucket for carrying live bait or the like and adapted to be towed behind a boat comprising a hollow shell, preferably of resilient material with a spring-pressed door normally covering an opening into the interior chamber. Latching means provides for securing the door in an opened position to enable the bucket to be loaded or emptied. Releasing means actuable from the exterior of the shell frees the door from its latching engagement. The releasing means can be a portion of the latching member extending exteriorly of the shell or the door can be released by retracting an extendable handle so that portions of the same slide interiorly of the shell and engage the door.

12 Claims, 5 Drawing Figures

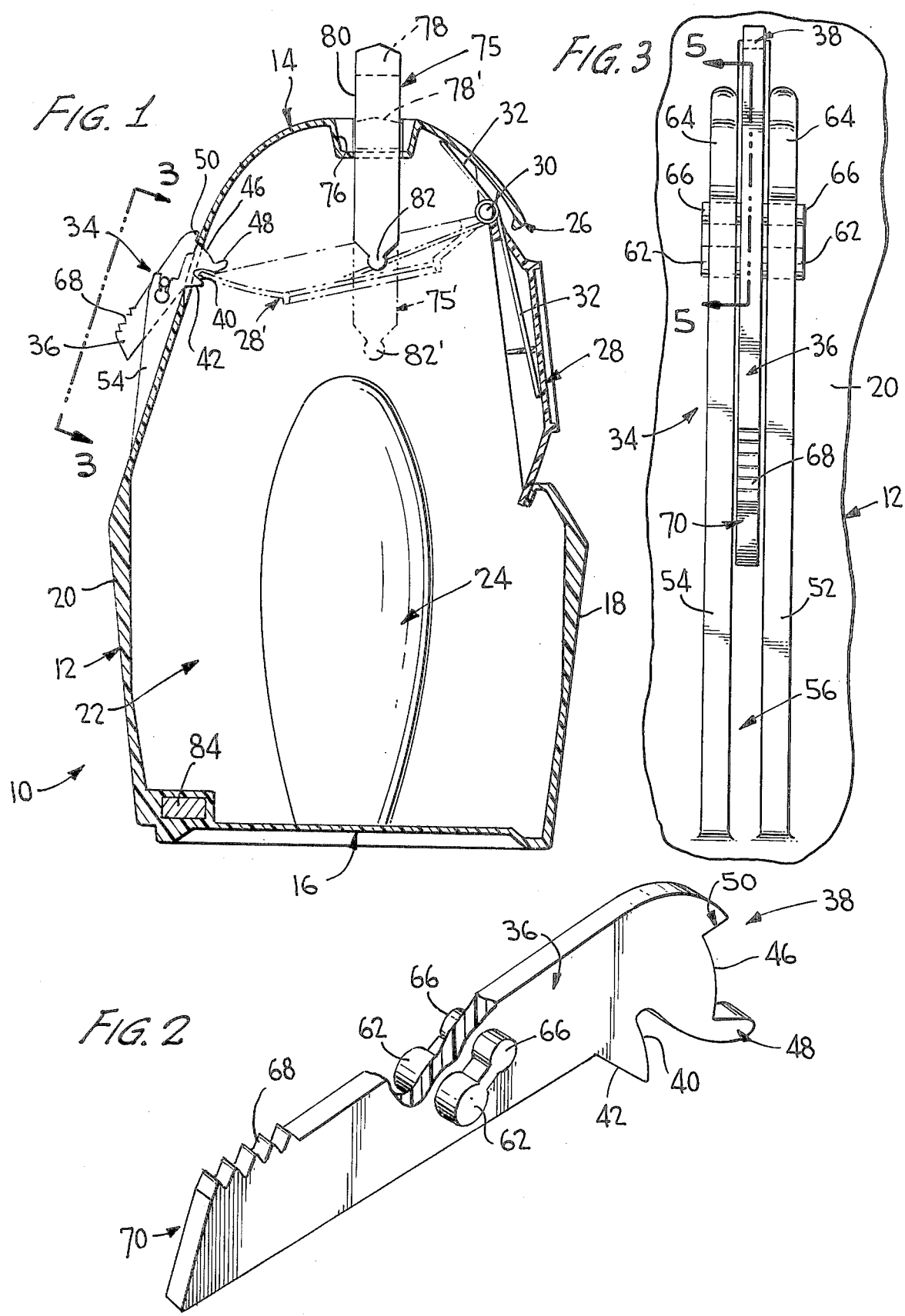

TROLLING BUCKET WITH LOADING LATCH MEANS

BACKGROUND OF THE INVENTION

This invention relates generally to the field of containers, and more particularly to a plastic floatable container for holding live bait or the like while being towed behind a boat, customarily referred to as a trolling bucket.

Trolling buckets are well known in the art and generally comprise a container in which live bait such as minnows, together with a quantity of water, may be carried as by towing the same behind a boat, in order to keep the live bait fresh until ready for actual use. A highly desirable form of trolling buckets will be seen in U.S. Pat. No. 3,728,812, commonly assigned with the instant application, the entire disclosure of which is incorporated herein by reference. From the foregoing U.S. patent it will be seen that trolling buckets ordinarily are substantially closed, although they include an access opening to permit bait or the like to be placed within, or removed from, the interior chamber. Normally, such opening is closed or blocked by a door member which is capable of being pivoted to an opened position within the interior of the bucket.

Prior devices of the type described require that the door means be held in an opened position against a spring loading when access to the interior is necessary. Maintaining the door in such an opened position is sometimes difficult, and limits the ability of the user to perform other functions during loading of the trolling bucket.

SUMMARY OF THE INVENTION

With the above background in mind, it is therefore a primary object of the present invention to provide a trolling bucket such as shown in U.S. Pat. No. 3,728,812, but including latching means for engaging and releasably holding the door in an opened position during a loading operation, with means actuable from the outside of the bucket for releasing the latching means so that the door can be automatically returned to its closed position substantially blocking the access opening.

A further and more specific object of the instant invention is to provide a loading latch for a bait bucket or the like which automatically engages and temporarily holds the access door when it is moved to its opened position, by latching means located interiorly of the bucket, while providing one or more means engagable outside of the bucket for releasing the latching relationship.

Still more specifically, an important feature of this invention is to provide a latching mechanism which will automatically be released when the trolling bucket handle is retracted into a recess defined in the forward end of the shell. Alternatively, or cumulatively, the latching mechanism can be released by utilizing an elongated latching member, pivotally supported intermediate its ends, with one end extending interiorly of the shell through a slot in the shell wall to perform the latching function, and the opposite end extending exteriorly of the shell, with pressure against the opposite end withdrawing the latching portion from engagement with the door means.

BRIEF DESCRIPTION OF THE DRAWINGS

Other and further objects reside in the combination of elements, arrangement of parts, and features of construction, all as will be apparent from the following detailed description of the preferred embodiment of the invention, which makes reference to the accompanying drawings wherein:

FIG. 1 is a longitudinal cross-sectional view through a trolling bucket according to the instant inventive concepts, with the door means being shown held in its opened position by the latching means in dotted lines, and with the retracted position of the handle means also being shown in dotted lines;

FIG. 2 is an enlarged perspective view of the latching member, partially broken away for illustrative clarity;

FIG. 3 is an enlarged fragmentary elevational view taken substantially along the lines 3—3 of FIG. 1;

Like characters refer to like parts throughout the several views of the drawings.

DETAILED DESCRIPTION OF THE PREFERRED EMBODIMENTS OF THE INVENTION

Figure 4:
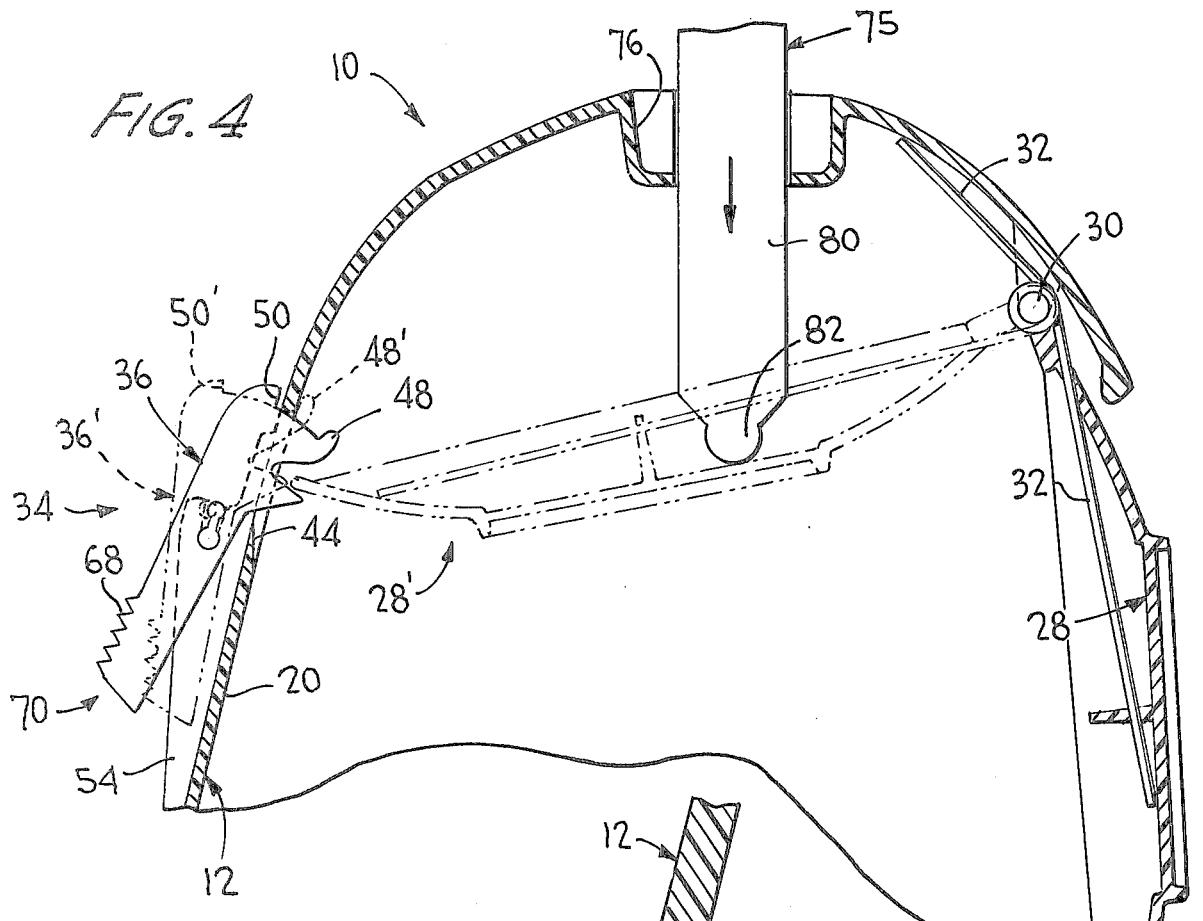
FIG. 4 is an enlarged fragmentary cross-sectional view through the forward end of the bait bucket of this invention showing the door means held in its opened position in dotted lines and showing the releasing position of the latching means in dotted lines.

Referring now to the drawings, and more particularly to FIG. 1, a trolling bucket according to the instant inventive concepts is designated generally by the reference numeral 10. As shown, the trolling bucket 10 is in the form of a generally closed, hollow, shell 12, preferably formed of a somewhat resilient plastic material such as polyethylene or the like.

The shell 12 preferably has a rounded forward end 14 and a generally flat, transverse, rear wall portion 16, with rounded upper and lower wall portions, 18, 20 together defining an interior chamber 22 within the shell 12.

As disclosed in the aforementioned prior U.S. Pat. No. 3,728,812, the upper wall portion 18 of the shell 12 preferably has a greater arc of curvature than the lower wall portion 20, with flotation compartments such as illustrated at 24 being filled with a foamed flotation material (not shown) to render the trolling bucket 10 highly floatable. Of course, while the foregoing features are desirable, they are not critical to the basic instant inventive concepts which are more specifically directed to the features of the loading latching and releasing means and which could obviously be used with a trolling bucket or the like having a different configuration.

In any event, the trolling bucket 10 must include portions which define an opening 26 to provide access to the chamber 22 with a door means 28 generally corresponding in shape to the opening 26. Hinge means 30 secure the door means 28 to the interior of the upper wall 18 of the shell 12 adjacent the opening 26 for movement between a closed position such as shown in solid lines in FIGS. 1 and 4 in which the door means 28 blocks the opening 26 and precludes escape of bait or the like from within the chamber 22, and an opened position such as shown in dotted lines in FIGS. 1 and 4, in which the door means 28' is spaced from the opening 26, interiorly of the chamber 22, to thereby unblock the opening 26 and permit bait or the like to be placed within, or removed from, the chamber 22.

Door biasing means, in the form of spring means 32 is provided for normally urging the door means 28 into its closed position.

By referring to FIGS. 1 and 4 it will be seen that in the opened position shown in dotted lines at 28', the door mean spans the forward end 14 of the chamber 22. According to the primary concepts of the instant invention, a latching means designated generally by the reference numeral 34 is carried by portions of the lower wall 20 of the shell 12 opposed to the opening 26, such latching means engaging a portion of the door means 28' and releasably holding the door means in the opened position in a manner to be described in more detail hereinafter.

The preferred embodiment of latching means 34 according to the instant inventive concepts will be readily understood by reference to the enlarged Figures of the drawing. Specifically, in FIG. 2, an enlongated latching member 36 will be seen as having a first end 38 including generally tapered, V-shaped latching portions 40 adapted to engage, and releasably hold, an edge portion of the door means 28' in its opened position as seen particularly in FIGS. 1 and 4. The latching portions 40 include a lower tapered edge 42 over which the peripheral portion of the door means 28' rides in order that the door means can be engaged by the V-shaped latching portions 40.

Figure 5:
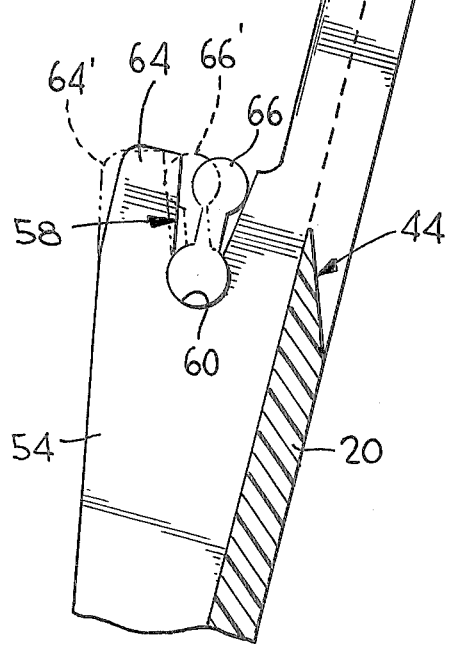
FIG. 5 is an enlarged fragmentary detailed cross-sectional view taken substantially along the lines 5—5 of FIG. 3 and illustrating the manner in which the latch biasing means functions in dotted lines.

The latching portions 40 of the latching member 36 pass through an elongated slot 44 defined within the lower wall 20 of the shell 12 as will be seen particularly in FIGS. 1, 4 and 5. This enables the latching portions 40 of the latching member 36 to gain access to the interior chamber 22 of the shell 12, with the remainder of the latching member 36 being located exteriorly of the shell 12 in a manner and for a purpose to be described in more detail hereinafter.

The first end 38 of the latching member 36 also includes a cutaway section or recess 46 which in turn defines stop means 48, 50 located interiorly and exteriorly of the lower wall 20 of the shell 12 as will be seen particularly in FIGS. 1 and 4, in order to limit the movement of the latching member between a latching position shown in full lines at 36 in FIG. 4 and a releasing position shown in dotted lines at 36' in that Figure. Thus, the stop means 48, 50 function to limit the movement of the latching member 36 and also assist in precluding disengagement of this element from the shell 12.

A pair of parallel rib means 52, 54 (seen particularly in FIG. 3) are provided on the exterior of the lower wall 20 of the shell 12, and defined between them an elongated channel 56 aligned with the slot 44. Intermediate portions of the latching member 36 are received within the channel 56, with the latching member being supported and guided in its movement by the rib means 52, 54.

As will be seen particularly in FIG. 5 each of the rib means includes portions defining an elongated slot 58, the lower end of which is closed and forms bearing means 60 for snap-fit receipt of enlarged pivot pin means 62 extending from opposite sides of the latching member 36. The rib means 52, 54 are formed of a resilient material, with the closed portions defining the bearing means 60, as well as the portions defining the pivot pin means 62, being slightly larger than the immediately adjacent portions of the slot 58 as will be seen particularly in FIG. 5, thus enabling the aforementioned snap-fit assembly and assisting in maintaining engagement between the latching member 36 and the shell 12. Of course, the pivot pin means 62 rotate within the bearing means 60 to enable the latching member 36 to be moved between its latching and releasing positions.

The upper outer portions of the rib means 52, 54 define resilient tabs 64 seen particularly in FIG. 5 and the latching member 36 is provided with a further pair of pin means 66 extending from its sides in spaced relationship to the pivot pin means 62. In the embodiment shown in the drawings, the pivot pin means 62 and the further pin means 66 have been shown as portions of a single integral boss on either side of the latching member 36, although it will be readily understood that these elements could be formed by separate members, or even by independent pins extending through and otherwise secured to the latching member 36. In any event, the further pin means 66 bear against the resilient tabs 64 when the latching member 36 is moved to its releasing position in a manner to be explained in more detail hereinafter. As will be seen particularly in FIG. 5, the resilient tabs are forced outwardly under pressure from the further pins 66 to the dotted line position shown at 64' when the latching member 36 is in its releasing position 36' with the resilience of the tabs 64 functioning to bias or normally urge the latching member 36 to its latching position. By reference particularly to FIG. 2, it will be seen that the pivot pin means 62 and the further pin means 66 are positioned at an angle relative to the elongated dimension of the latching member 36 so that when a plane through the axes of the pivot pin means 62 and further pin means 66 is parallel to the lower wall 20 of the shell 12 as seen in full lines in FIG. 5, the latching portion 40 of the latching member 36 extends through the slot 44 into latching position. When the further pin means 66 are forced away from the exterior of the lower wall 20 of the shell 12 as seen in dotted lines at 66' in FIG. 5 they engage against the resilient tabs 64 and the latching portions 40 of the latching member 36 are withdrawn to the releasing position 36' seen in FIG. 4. This occurs when pressure is exerted against the ridged portion 68 at the second end 70 of the latching member 36 to provide a means actuable from the exterior of the shell 12 to release the latching engagement of the door means 28' and permit the same to return to its closed position under the influence of the biasing means 32.

A further technique for freeing the door means 28' of its holding relationship with the latching means 36 is provided by the arrangement and construction of the handle means 75 located at the forward end 14 of the shell. It will be seen that the forward end 14 includes portion defining a recess 76 and that the handle means 75 includes gripping means 78 and leg means 80 which are slidably supported by portions of the shell for movement between an extended position shown in full lines in FIG. 1 at 75 in which the gripping means 78 is spaced from the exterior of the shell 12 and accessible for carrying or towing the bucket, and a retracted position shown in dotted lines at 75' in FIG. 1 in which the gripping means 78' is located within the recess 76. Of course, stop portions, designated generally by the reference numeral 82 are secured to the leg means 80 and abut against the interior surface of the forward end 14 of the shell 12 when the handle means 75 is in its outermost or fully extended position to preclude complete withdrawal of the handle means 75 from its engagement with the shell 12. These stops means, or at least the inner end portions of the leg means 80, however, simultaneously function to engage the door means 28' in its opened and latched position to push the door means 28' free of engagement with the latching means 36 against the urging of the latch biasing means in the form of the further pin means 66 and the resilient tab means 64, so that the door means can return to its closed position under the influence of the door biasing means 32. Thus, the handle means 75 functions as an additional, separately actuable, releasing means to override the latching engagement of the door means.

Of course, the design of the latching portions 40 of the latching member 36, in conjunction with the strength of the latch biasing means must be such as to override the urging of the door biasing means 32 once the door means has been engaged as shown at 28' by the latching means 34.

Various other details of the trolling bucket, such as the incorporation of a weight means designated generally by the reference numeral 84 or the use of a keel-like rib of the type shown in aforementioned U.S. Pat. No. 3,728,812 as well as the various openings necessary for the passage of water into and out of the chamber 22 to maintain the bait therewithin fresh, are all within the instant inventive concepts, such that modification of the preferred embodiments described above can be readily accomplished by those skilled in the art. Yet, it will now be seen that there has herein been provided an improved trolling bucket having a loading latch means which functions to engage and releasably hold the door means in an opened position to permit access to the interior chamber of the bucket, with releasing means being provided including portions actuable from outside the trolling bucket to readily permit the door to return to its closed position under the influence of a spring-pressed hinge means.

Thus, there is herein disclosed an improved trolling bucket which satisfies all of the objects of the instant invention as set forth above, and others, including many advantages of great practical utility and commercial importance.

The embodiments of the invention in which an exclusive property or privilege is claimed are defined as follows:

1. A trolling bucket for carrying live bait or the like comprising:
   a generally closed, hollow, shell having a forward end, a rearward end, an upper wall and a lower wall together defining a chamber within said shell;
   portions of said upper wall of said shell defining an opening to provide access to said chamber;
   door means generally corresponding in shape to said opening;
   hinge means securing said door means to said upper wall of said shell adjacent said opening for movement of said door means between a closed position in which said door means substantially blocks said opening and precludes escape of bait or the like from within said chamber, and an opened position in which said door means is spaced from said opening interiorly of said chamber to thereby unblock said opening and permit bait or the like to be placed within, or removed from, said chamber;
   door biasing means normally urging said door means into said closed position;
   latching means including latching portions located interiorly of said shell for engaging and releasably holding said door means against the urging of said door biasing means when said door means is moved to said opened position; and
   releasing means for releasing said door means from its holding relationship with said latching means to permit said door means to be moved to said closed position by said door biasing means, said releasing means including portions located exteriorly of said shell for actuating said releasing means.

2. The trolling bucket of claim 1 wherein said door means at least partially spans the forward end of said chamber in said opened position, said latching portions of said latching means engaging and releasably holding a portion of said door means spaced from said hinge means in said opened position of said door means.

3. The trolling bucket of claim 2, further including handle means secured to said forward end of said shell and adapted to permit the bucket to be carried or towed behind a boat.

4. The trolling bucket of claim 3 wherein said handle means includes gripping means and leg means connected to said gripping means, said leg means being slidably supported by portions of said shell for movement between an extended position in which said gripping means is spaced from the exterior of said shell and accessible for carrying or towing the bucket, and a retracted position in which said gripping means is juxtaposed to portions of said shell, portions of said leg means being extended within said chamber toward said rearward end of said shell in said retracted position of said handle means to engage said door means and push said door means free of its holding relationship with said latching means whereby said handle means also functions as said releasing means when said handle means is moved to its retracted position.

5. The trolling bucket of claim 4 further including portions of said forward end of said shell defining an elongated recess, said gripping means of said handle means being located within said recess in the fully retracted position of said handle means.

6. The trolling bucket of claim 2 including portions of said lower wall of said shell defining an elongated slot, said latching means including an elongated latching member having first and second spaced ends, pivot means pivotally supporting said latching member intermediate its ends for movement between a latching position in which it engages and releasably holds said door means when said door means is in said opened position, and a releasing position in which said door means is freed of its holding relationship with said latching means, said first end of said latching member including said latching portions and extending through said slot to the interior of said shell, said first end also including portions interiorly and exteriorly of said shell defining stop means for limiting the movement of said latching member between said latching and releasing positions, latch biasing means normally urging said latching member to said latching position, said latch biasing means being stronger than said door biasing means to retain said door means in said opened position when said door means has been engaged by said latching means, actuation of said releasing means overriding said latch biasing means until said door means is released from its holding relationship with said latching means.

7. The trolling bucket of claim 6 wherein said second end of said latching member is located exteriorly of said shell and is spaced from said shell when said latching member is in said latching position, pressure on said second end of said latching member toward the exterior of said shell moving said latching member about said pivot means to said releasing position, whereby said second end of said latching member functions as said releasing means.

8. The trolling bucket of claim 7 including a pair of parallel rib means on the exterior of said lower wall of said shell, said rib means defining between them an elongated channel aligned with said slot and receiving intermediate portions of said latching member therein, portions of said rib means defining, transversely aligned bearing means, and pivot pin means extending from opposite sides of said latching member and being pivotally supported within said bearing means.

9. The trolling bucket of claim 8 wherein each of said rib means includes portions defining an elongated slot having a closed end defining a bearing means and a spaced open end for sliding a pivot pin means into engagement with said bearing means.

10. The trolling bucket of claim 9 wherein said rib means are formed of a resilient material, said bearing means and said pivot pin means being slightly larger than the immediately adjacent portions of said slots, whereby said pivot pin means are snap-fit into said bearing means.

11. The trolling bucket of claim 9 wherein said rib means are formed of a resilient material, portions of said rib means at said open end of said slots defining resilient tabs and further pin means extending from the sides of said latching member is spaced relationship to said pivot pin means, said further pin means bearing against said resilient tabs when said latching member is moved to said releasing position to thereby define said latch biasing means.

12. The trolling bucket of claim 3 wherein said releasing means comprises separately actuable first and second releasing means, said handle means being slidably supported by portions of said shell for movement between an extended position wherein portions of said handle means are spaced from the exterior of said shell, and a retracted position wherein portions of said handle means are extended within said chamber toward said rearward end of said shell to push said door means free of its holding relationship with said latching means and thereby define said first releasing means, said latching means including an elongated latching member having first and second spaced ends, pivot means pivotally supporting said latching member intermediate its ends for movement between a latching position and a releasing position, portions of said lower wall of said shell defining an elongated slot slidably receiving said first end of said latching member therethrough, said latching portions of said latching means being defined on said first end of said latching member, latch biasing means normally urging said latching member to said latching position, said second end of said latching member being located exteriorly of said shell and being spaced from said shell when said latching member is in said latching position, pressure on said second end of said latching member toward the exterior of said shell moving said latching member about said pivot means to said releasing position and thereby defining said second releasing means.

* * * * *